Figures 1, 2:
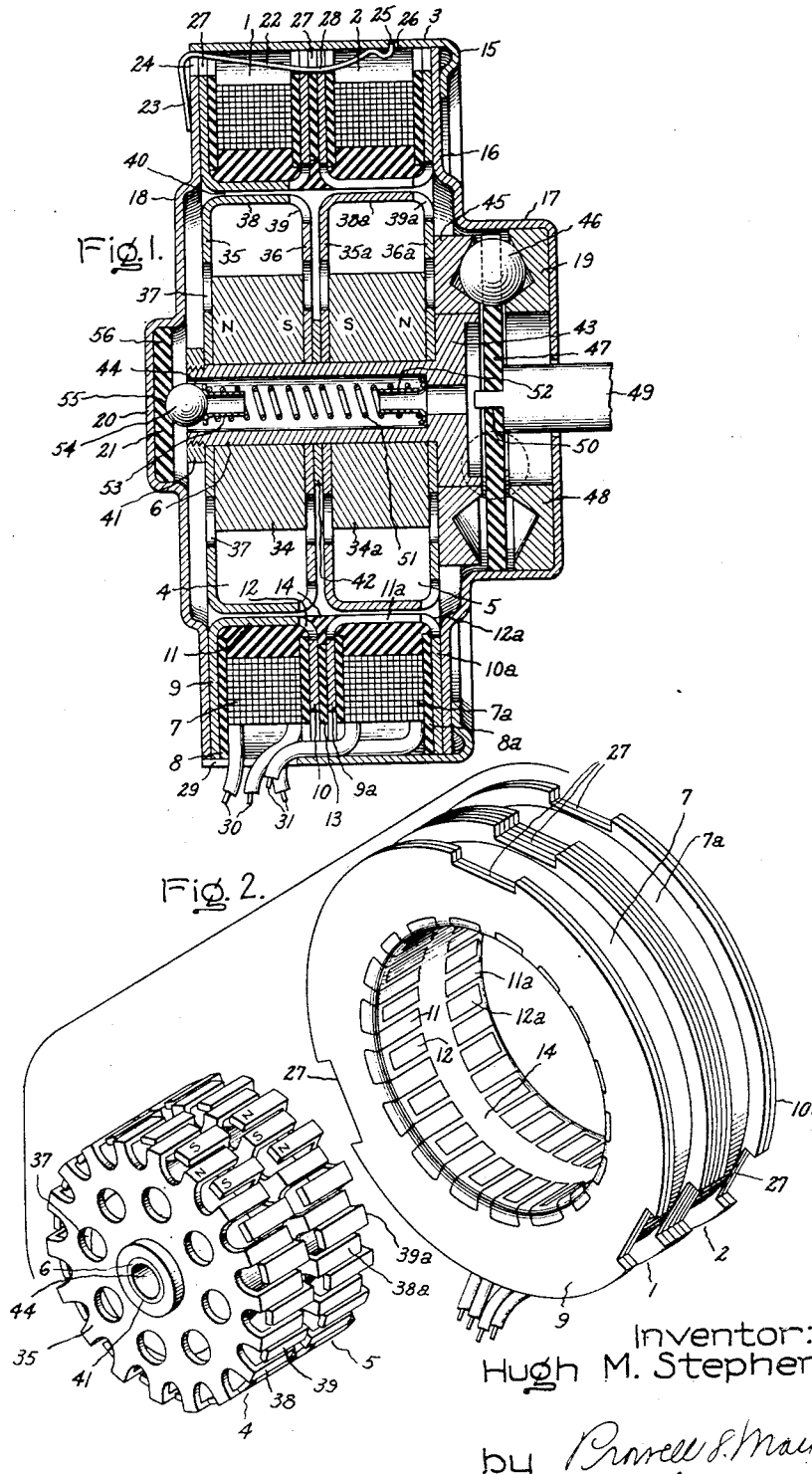

April 10, 1951　　　H. M. STEPHENSON　　　2,548,633
DYNAMOELECTRIC MACHINE

Filed Aug. 28, 1947　　　　　　　　　　2 Sheets-Sheet 1

Inventor:
Hugh M. Stephenson,
by Prowell S. Mack
His Attorney.

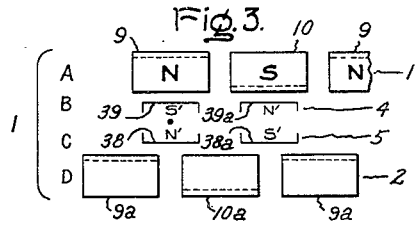
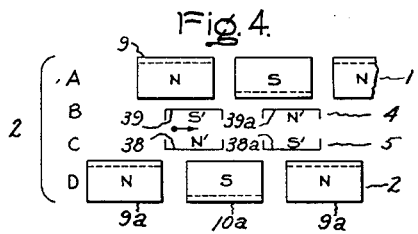
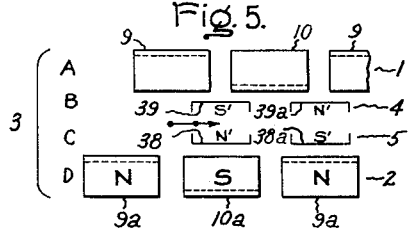
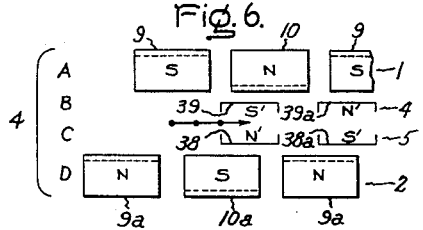
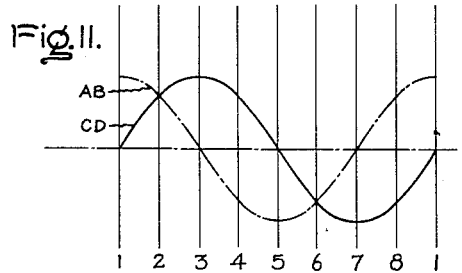
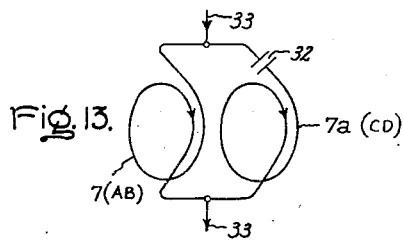
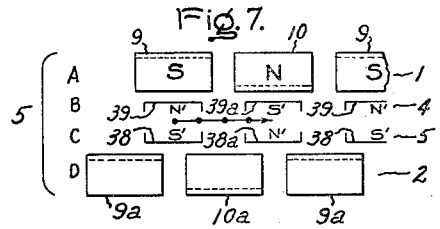
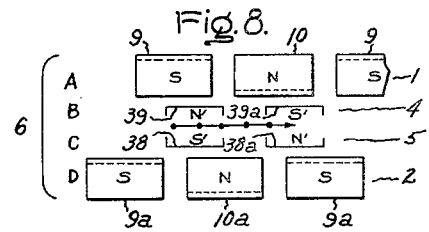
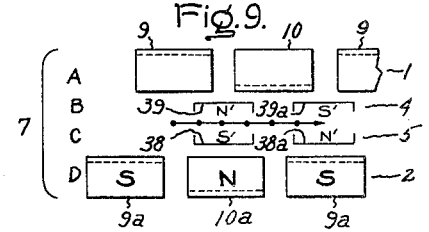
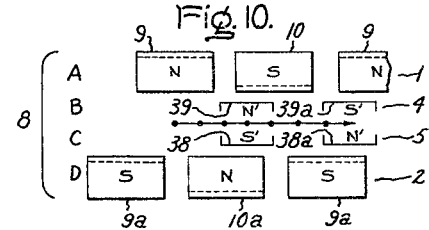
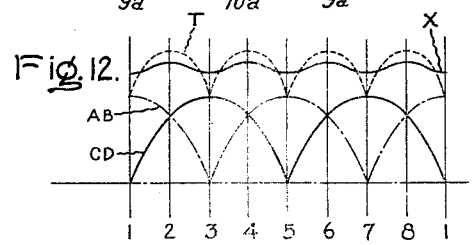

Patented Apr. 10, 1951

2,548,633

UNITED STATES PATENT OFFICE 2,548,633

DYNAMOELECTRIC MACHINE

Hugh M. Stephenson, Fort Wayne, Ind., assignor to General Electric Company, a corporation of New York Application August 28, 1947, Serial No. 771,073

13 Claims. (Cl. 172—120)

This invention relates to dynamoelectric machines of the synchronous inductor type.

Numerous single phase dynamoelectric machines of the inductor type have been constructed utilizing low inertia rotors with a large number of poles giving a fairly low synchronous speed. These motors are particularly adapted to be manufactured in fractional horse power frame sizes for the operation of devices such as clocks, phonographs, fans, and the like. Motors of this general type are described in Patents 2,105,513 and 2,122,307 to Welch and assigned to the assignee of the present application. The dynamoelectric machine of this application is in some respects similar in the theory of operation to the synchronous inductor motors described in these patents, this invention being concerned primarily with improved structural arrangements for such motors.

An object of this invention is to provide an improved dynamoelectric machine of the synchronous inductor type.

Another object of this invention is to provide an improved single phase motor of the synchronous inductor type characterized by its efficiency, low speed, self-starting characteristic, and quiet operation.

Further objects and advantages of this invention will become apparent and the invention will be better understood from the following description referring to the accompanying drawings. The features of this invention which are believed to be novel and patentable will be pointed out with particularity in the claims annexed to and forming a part of this specification.

For a better understanding of this invention reference is made in the following description to the accompanying drawings in which Fig. 1 illustrates a side view, in section, of a motor embodying the present invention taken through the stator and rotor on the axis of rotation. Fig. 2 shows a partially exploded view of the rotor and stator members of the motor of Fig. 1. Figs. 3 through 10, inclusive, are schematic representations showing a series of instantaneous positions of the rotor of the motor of Fig. 1 to illustrate the operation of this motor. Fig. 11 shows the position of the instantaneous rotor positions of Figs. 3 through 10 relative to one complete cycle of energizing current. Fig. 12 illustrates the summation of torques over the same period shown in Fig. 11. A schematic diagram of the stator windings of this motor is shown in Fig. 13.

In carrying out the present invention, there are provided two single phase energizing coils arranged to be excited by currents which are approximately 90° out of phase. Each coil is provided with a surrounding magnetic circuit having a plurality of salient pole teeth which are alternately polarized as north and south by the excitation of the coils. Associated with each set of stator salient pole teeth, is a rotor member provided with a permanent magnet which furnishes unidirectional flux and polarizes the rotor pole teeth at north and south polarities.

Referring now to Figs. 1 and 2, it will be seen that the motor of this invention is essentially made up of two single phase motor elements placed side by side, the stator members 1 and 2 being mounted in a common shell or casing 3, and the rotor members 4 and 5 being mounted on a common shaft 6.

The single phase stator member 1 cooperating with the rotor member 4 comprises an annular single phase alternating current energizing coil 7 wound on a spool member 8 formed of insulating material. Closely abutting the exterior walls of the spool member are two identical washer-shaped magnetic iron members or plates 9 and 10 which fit snugly within the shell member 3. The above stator parts form a cylinder about the rotor and are concentric therewith and with the rotor shaft 6. The coil 7 is thus encased by magnetic material with the exception of its inner periphery, the washer-shaped plates 9 and 10 forming with the shell member 3 a substantially channel-shaped magnetic member around the coil with its open side facing the rotor.

The plate members 9 and 10 are provided with the same number of evenly spaced salient pole teeth 11 and 12 formed or punched at their inner peripheries. These teeth are bent axially toward each other to intermesh and are so spaced that when intermeshed in opposed pairs, they present two adjacent internal peripheries of intermeshed pairs of teeth for each stator member, the teeth of plate member 9 forming the row of teeth 11 and the teeth of plate member 10 forming the row of teeth 12. Thus, the stator member has a circular, internal, intermeshed group of evenly spaced pole pieces with alternate poles adjacent and extending from the opposite side walls of the stator magnetic structure. It will be apparent that when the coil is energized with single phase alternating current, the group of poles 11 will be at one magnetic polarity at any given instant when the other group of poles 12 is at the opposite polarity, these polarities reversing with the alternating current reversals.

The other single phase stator member which cooperates with the rotor member 5 is similar to the one just described above and its corresponding parts are designated by like reference characters followed by the letter a. The two stator members 1 and 2 are separated by a non-magnetic spacer member 13 since the direct abutting of the adjacent washer members 10 and 9a would tend to form three poles instead of four distinct poles, the desired number. The pair of punchings of the stator member 1 is indexed ahead of the pair of punchings of the stator member 2 by ¼ tooth pitch, and the two stator members are then moulded together in a plastic compound as at 14, to maintain the proper tooth relation. The outer magnetic shell member 3 is common to both stator members and forms a closure for the magnetic circuits of the stator structure. This shell member is preferably a drawn steel shell which is open at one end and which has a flange 15 formed at the other end thereof. A drawn nonmagnetic end flange 16 having a cavity 17 is pressed into the shell 3 and abuts the flange 15. Flange 18, which is also formed of non-magnetic material, is provided at the other end of the motor. Both end flanges 16 and 18 are formed of non-magnetic material in order to prevent excessive magnetic leakage or alteration of the intended flux paths. The cavity 17 in end flange 16 is formed to support a ball bearing differential gear assembly 19, and the flange 18 contains a cavity 20 to accommodate a ball thrust bearing assembly 21, both of which will be described in more detail hereinafter.

The rotor members are supported between the ball bearing differential 19 and the ball thrust bearing 21, and the entire assembly is clamped together by a plurality of clamping members 22. These clamping members, which are more fully described in the co-pending application Serial No. 771,019, filed August 28, 1947, now Patent No. 2,456,934, issued December 21, 1948, of Feiertag, assigned to the assignee of the present application, are provided with a lip 23, and which are inserted through an opening 24 in the end flange 18 and are provided with another lip 25 which cooperates with an opening 26 in the outer shell 3. In accordance with the above application, these clamping members are positioned in grooves 27 in the stator structure, the bowed portion 28 bearing against the inner surface of the central groove which acts as a fulcrum to force the lip 25 into the opening 26 and to cause the lip 23 to tightly engage the end flange 18. These members are released by depressing lip 25 with a suitable tool, such as a small screw driver, which in turn releases the spring pressure of lip 23 on flange 18 and enable the member to be easily removed.

An opening, or openings 29 are cut into the stator shell 3 in order to bring out the leads 30 and 31 for the coils 7 and 7a. Referring to Fig. 13, a condenser 32, or other element, is included in the circuit of one coil 7a, so that the single phase fluxes of the two motor elements are 90° out of phase. The circuits of the two coils are connected in parallel to a single phase source 33.

Referring now to rotor member 4, the hollow, nonmagnetic shaft 6 of the motor passes through a circular bore of a cylindrical shape permanent magnet 34. This magnet is polarized axially parallel to the axis of the shaft 6 as indicated in Fig. 1. Abutting against the opposite ends of the permanent magnet are identical magnetic iron spider members 35 and 36. Each such spider member is shown as a disk-shaped plate, openings 37 being provided for purposes of lightness which are essential for a low inertia rotor. The spider members 35 and 36 are provided with the same number of evenly spaced salient pole teeth 38 and 39 equal in number to the stator teeth. These teeth are bent axially toward each other to intermesh in opposed pairs of presenting two adjacent external peripheries of intermeshed teeth for the rotor member 4, these teeth being adjacent and concentric with the rows of teeth 11 and 12 of stator member 1 and forming an air gap 40 therebetween. Thus, the permanent magnet 34, polarizes the teeth 38 at one magnetic polarity, shown here as north, and the teeth 39 at the opposite magnetic polarity, shown here as south.

The other rotor member 5 is similar to the one just described and its corresponding parts are designated by like reference characters followed by the letter a. The hollow shaft 6 is common to both rotor elements and after correct assembly can be secured to the shaft by a threaded nut, 41 so that when the rotor parts are assembled, the plates of the spider members 38 and 39, 38a and 39a and the permanent magnets which they embrace, 34 and 34a respectively, are securely held in proper tooth alignment as further described. The adjacent spider members 36 and 35a are separated by a non-magnetic spacing washer member 42. The magnets 34 and 34a are mounted on the shaft 6 in opposition, for instance, as shown here with their south poles adjacent. The teeth 38 of rotor member 4 are aligned with the teeth 38a of rotor member 5, and the teeth 39 are likewise aligned with the teeth 39a. In addition, the rotor members 4 and 5 are preferably positioned so that the teeth 38 and 38a are of opposite magnetic polarity, the teeth 39 and 39a being likewise of opposite magnetic polarity.

In an alternative design, the rotor members 4 and 5, formed as above, may be placed adjacent to each other with the spacing member 42 therebetween, held in a suitable fixture, and the entire assembly then cast in a non-magnetic matrix metal which includes a hub 43, which serves as a bearing mount, and a cavity 44.

Mechanically the rotor element is supported by a rotary ball bearing race 45 mounted on the rotor hub 43, under pressure on balls 46 which are spaced by ball cage 47. The balls 46, three having been found to be satisfactory, are seated in the stationary ball race 48 which is mounted in the rear of the cavity 17 of end flange 16. The drive of the rotor is taken from the ball cage 47 of the differential by a tongued shaft 49 inserted in the slot 50 in the cage. The pressure on the ball race 45 is provided through the thrust spring 51 carried in the rotor cavity 44, and by the ball thrust against the opposite end flange 18. The spring 51 is seated around spring seat 52 at the differential end of the cavity 44 and spring seat 53 at the opposite end of the cavity. A thrust ball 54 is carried by spring seat 53 and is seated in a pocket 55 in thrust disk 56 which is then seated in the cavity 20 in the end flange 18. This thrust combination is set up with sufficient pressure to maintain the concentricity of the rotor in the stator air gap, as well as to afford sufficient driving torque to the ball cage 47, the pressure being adjusted to provide a positive rolling differential drive supplying sufficient torque to drive the load satisfactorily but also allows slipping of the balls 46 in their races at some predetermined value less than that of the maximum motor torque.

The ball bearing differential speed reduction assembly described above is more fully described in the co-pending application Serial No. 771,074, filed August 28, 1947, now Patent No. 2,467,870, issued April 19, 1949, of the present inventor and assigned to the assignee of the present application. By the proper proportionment of the elements of this ball bearing differential, a substantially two to one speed reduction from the motor speed to the driving ball cage power take-off 47 can be obtained. The efficiency of such an arrangement is very high and the output speed one half that of the motor at practically twice the motor torque. In addition, this arrangement permits the motor to start and accelerate a considerable inertia load due to the control clutch slip, and tends to smooth out minute, non-uniform speed variations, arising from the rotor-stator tooth pattern and the alternating current frequency pulsations.

Referring now to Figs. 3 through 10 inclusive, there is shown a schematic diagram of the two adjacent single phase stator members 1 and 2 and rotor members 4 and 5 with intermeshed salient pole teeth 9, 10 and 9a, 10a associated with stator members 1 and 2 respectively, and 38, 39 and 38a, 39a associated with rotor members 4 and 5 respectively. The permanent polarization of the rotor teeth 38, 39 and 38a, 39a by the permanent magnets is shown by the designation S' and N'. The alternating current excitation of each of the stator windings when considered individually, produces unidirectional pulsating fields. However, when the symmetrical tooth pattern of one stator is displaced circumferentially to the proper angle, as described above, matching the desired electrical phase displacement, the dual rotor, wherein the teeth of opposite polarity are in axial alignment, will rotate in a single direction as will be shown hereinafter.

For purposes of simplicity of explanation when considering Figs. 3 through 11 inclusive, the letters A and B indicate the motor whose current, because of the capacitor phase displacement, leads the current in the other motor, which is designated as CD, by substantially 90 electrical degrees. The starting current of the AB motor is designated by the dot-dash line in Fig. 11 and the starting current of the CD winding is designated by the solid line.

Referring now to Fig. 3, there is shown the instantaneous position of the rotor when the currents are as shown at station 1 in Fig. 11. The maximum flux in the teeth of stator A is designated by the N and S polar designations. The flux in the CD stator winding is zero. Moving now to Fig. 4 which is station 2 of Fig. 11, the flux of the AB winding has started to decay and the flux of the CD winding has started to increase as shown by the $n$ and $s$ in the poles of the D stator. Thus, the permanently excited unloaded rotor B and C will move to the right as indicated in Fig. 4. This succession can be traced through all the stations of Fig. 11, corresponding to Figs. 3 through 10 inclusive, which completes the movement of the rotor through one complete cycle, in a uniform synchronous movement.

The summation of the torques from the two motors AB and CD is shown in Fig. 12 where AB is the torque from the flux of motor AB and CD the torque from the motor CD, T being the summation of these fluxes, and X the resultant average of the torques influenced by the inherent inertia of the rotor.

The rotor will proceed in the proper direction depending upon the winding succession and advances one pair of opposing poles per cycle, the resultant R. P. S. synchronous speed being equal to the frequency in cycles per second divided by the number of pairs of poles. The optimum motor for maximum efficiency would be one where the alternating current flux from the external supply is substantially equal to the permanent field flux, however, it has been found that considerably more torque can be obtained by a large percentage of applied flux without greatly depreciating the efficiency.

In a motor of fractional horse power frame size constructed in accordance with this invention, the preferred magnetic material used was an alloy of iron, nickel, aluminum, cobalt and titanium such as described in Patent 2,295,082 to Jonas, assigned to the assignee of the present application, although any permanent magnet material can be used. The magnets were cast nearly to size and machined on their parallel faces. The stator windings were formed of 3200 turns of insulated .004" copper wire for each stator coil. A .57 mfd. capacitor was required to split the 110 volt, 60 cycle, single phase supply for polyphase directional operation.

Such a motor weighed approximately 1 lb. and for an input of under 8 watts, produced an output of approximately 4 ounce-inches from the 200 R. P. M. rotor, or 8 ounce-inches at 100 R. P. M. from the ball cage take-off.

This motor is practically instantaneous in starting since it will reach full speed in less than one-half cycle, is synchronous and directional, delivers a definite maximum torque, is instantly reversible, and stops upon interruption of the current supply with practically no coasting. The motor can be stalled indefinitely with no fear of burning-out the winding since the stalled input is less than the full load running input. The ball differetial pressure can be adjusted to slip at any desired torque value under the maximum motor torque providing a safety slip clutch sufficient to accelerate heavy inertia loads. The slip torque can be adjusted so that the motor will start under a stalled load and afford a smooth torque supply from zero to synchronous motor speed.

While this motor has been shown in the drawings as constructed with the rotor teeth aligned and the teeth of one stator member indexed circumferentially from the teeth of the other stator member, it is to be understood that the motor will operate satisfactorily with these conditions reversed, i. e., with the teeth of one rotor member indexed circumferentially from the teeth of the other rotor member of the corresponding teeth of the two stator members in axial alignment.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A split-phase inductor type synchronous dynamoelectric machine comprising two single phase inductor-type dynamoelectric elements each having an outer stator member and a cooperating rotor member concentrically arranged within said stator member, said stator and rotor members being provdied with the same number of evenly spaced salient magnetic pole pieces in cooperative relation, each stator member having a single phase energizing coil for producing an alternating flux in its pole pieces with the adjacent poles at opposite magnetic polarity, each rotor member having a permanent magnet for supplying unidirectional flux and for polarizing the pole pieces of said rotor member at alternate north and south poles.

2. In combination, a pair of single phase synchronous inductor type dynamoelectric machine elements each having an outer magnetic stator member and a cooperating magnetic rotor member concentrically arranged within said stator member, said stator and rotor members being provided wtih an equal number of evenly spaced salient magnetic pole pieces, each stator member having a single phase energizing coil for producing an alternating flux on its pole pieces with adjacent poles at opposite magnetic polarity, each rotor member having a permanent magnet for supplying unidirectional flux and for polarizing the pole pieces of said rotor member as alternate north and south poles, the pole pieces of one of said members being displaced circumferentially from the pole pieces of the other of said members.

3. A split-phase inductor type synchronous dynamoelectric machine, comprising two single phase inductor type dynamoelectric machine elements each having an outer magnetic stator member and a cooperating magnetic rotor member concentrically arranged within said stator member, said stator and rotor members being provided with the same number of evenly spaced salient magnetic pole pieces in cooperative relation, each stator member having a single phase energizing coil for producing an alternating flux on its pole pieces with adjacent poles at opposite magnetic polarity, and means for energizing said stator coils simultaneously by single phase currents which are displaced in phase, each rotor member having a permanent magnet for supplying unidirectional flux and for polarizing the pole pieces of said rotor member at alternate north and south poles, the pole pieces of one of said members being displaced circumferentially from the pole pieces of the other similar member.

4. A split-phase synchronous inductor type motor having an outer magnetic stator member and a cooperating magnetic rotor member concentrically arranged within said stator member; said stator member comprising two single phase energizing coils supported in a common magnetic casing, magnetic members on either side of each coil provided with a polarity of evenly spaced salient pole teeth at their inner peripheries which are magnetized at alternate polarities with an alternating flux when said coils are energized by alternating current; said rotor member comprising two rotor elements respectively opposite said stator teeth, each of said rotor elements comprising a pair of magnetic members having a plurality of evenly spaced salient pole teeth at their outer peripheries equal in number to the teeth on said stator members; each rotor element having a permanent magnet extending between said rotor magnetic member for polarizing the salient pole teeth of one rotor magnetic member at the opposite magnetic polarity from the salient pole teeth of the other rotor magnetic member.

5. A split-phase synchronous inductor type motor having an outer magnetic stator member and a cooperating magnetic rotor member concentrically arranged within said stator member; said stator member comprising two single phase energizing coils supported in a common magnetic casing, magnetic members on either side of each coil provided with a plurality of evenly spaced salient pole teeth at their inner peripheries which are magnetized at alternate polarities with an alternating flux when said coils are energized by alternating current; said rotor member comprising two rotor elements opposite said stator teeth, each of said rotor elements comprising a pair of magnetic members having a plurality of evenly spaced salient pole teeth formed at their outer peripheries equal in number to said stator teeth, each rotor element having a permanent magnet extending between said rotor magnetic members for polarizing the salient pole teeth of one rotor member at the opposite magnetic polarity from the same pole teeth of the other rotor member; and means for energizing said stator coils simultaneously by single phase currents which are displaced in phase, the pole teeth of one of said members being displaced circumferentially from the pole teeth of the other similar member.

6. In combination, a pair of synchronous single phase inductor type motors each having an outer magnetic stator member and a cooperating magnetic rotor member concentrically arranged within said stator member, the stator members being supported end to end in a common magnetic shell, a common shaft on which the rotor members are axially spaced, each rotor member comprising a pair of disk-shape magnetic spider members having the same number of evenly spaced teeth cut into their outer peripheries presenting two circular rows of external teeth, each of said rotor members having a permanent magnet having its axis coinciding with the rotor axis of rotation and polarized along such axis whereby the teeth of one disk member are polarized at the opposite magnetic polarity from the teeth of the other disk member, the magnet of one rotor member being mounted in opposition to the magnet of the other rotor member, each of said stator members having a single phase energizing coil, each coil having a pair of magnetic members on either side thereof, said members having the same number of evenly spaced teeth cut into their inner peripheries and equal in number to said rotor teeth to present two circular rows of internal teeth for each coil adjacent the corresponding rotor teeth, and means for energizing said stator coils simultaneously by single phase currents which are displaced in phase by approximately 90°, the teeth of one stator member being displaced circumferentially from the teeth of the other stator member, the teeth of said rotor members being in axial alignment.

7. An inductor type motor comprising an enclosing magnetic case, two single phase exciting coils within said case, washer shaped members of magnetic material fitted within said case on either side of each coil and having the same number of evenly spaced teeth cut in their inner peripheries presenting two circular rows of stator teeth for each coil, a rotor within said casing and concentric therewith, a spider member at either end of said rotor cooperating with and respectively adjacent said rows of stator teeth, each spider member comprising a pair of magnetic disks having the same number of evenly spaced teeth formed in their outer peripheries presenting two circular rows of rotor teeth for each spider member adjacent the corresponding rows of stator teeth, each spider member having a permanent magnet extending between the magnetic disks and polarizing said disks at opposite magnetic polarities, and means for energizing said stator coils simultaneously by single phase coils which are displaced in phase by approximately 90°, the two rows of teeth of one coil being displaced ¼ tooth pitch from the two rows of teeth from the other coil.

8. An inductor type synchronous motor comprising two single phase inductor type motors, each motor having cooperating outer magnetic stator and inner magnetic rotor members, a common shaft for both rotor members; each rotor member comprising a pair of disks of magnetic material having the same number of evenly spaced teeth cut at their outer peripheries with the outer extremities of said teeth being axially bent toward each other to form two circular rows of intermeshed teeth, a permanent magnet having its axis coincide with said shaft and polarized along such axis extending between said disks to polarize one disk and its teeth at one magnetic polarity and its teeth at the opposite magnetic polarity, the magnet of one rotor member being mounted in opposition to the magnet of the other rotor member; each stator member including an annular single phase energizing coil, a washer-shaped magnetic member on either of said coils, said washer shaped members and said coils being supported within a magnetic shell which is common to both stator elements, said washer shaped members having the same number of evenly spaced teeth cut at their inner peripheries and bent axially to form two rows of intermeshed teeth for each stator member adjacent and respectively cooperating with the teeth of the corresponding rotor member forming an air-gap therebetween; and means for energizing said coils simultaneously by single phase currents which are displaced in phase by approximately 90°, the two rows of teeth of one stator member being indexed circumferentially ¼ tooth pitch from the two rows of teeth of the other stator member.

9. In combination, a single phase inductor-type motor element having cooperating outer magnetic stator and inner magnetic rotor members; the stator member comprising an annular magnetic housing surrounding the rotor and having a channel-shaped cross section with the open side facing the rotor, a single phase energizing coil positioned in said housing surrounding and concentric with said rotor, a circular row of evenly spaced magnetic teeth formed on each inner edges of said housing, said teeth being bent axially toward each other to present two intermeshed internal peripheries of teeth; the rotor member comprising a pair of magnetic spiders each having a circular row of evenly spaced magnetic teeth formed on the outer periphery thereof and equal in number to said stator teeth, said rotor teeth being bent axially toward each other presenting two intermeshed peripheries of teeth adjacent and cooperating with said stator teeth and forming an airgap therebetween; another similar single phase motor element; a common shaft for both rotor members, two permanent magnets on said shaft and polarized on an axis along said shaft associated respectively with each rotor member for polarizing said spiders and the teeth of each rotor member at opposite magnetic polarities, said magnets being mounted in opposition, the spiders being mounted on said shaft so that the teeth which are bent in the same direction are polarized at opposite magnetic polarities, the two stator members being supported end to end within a common magnetic shell, the teeth of one stator member being displaced circumferentially from the teeth of the other stator member by ¼ tooth pitch, and means for energizing the two coils of said stator members by currents which are displaced in phase by approximately 90°.

10. A split phase inductor type synchronous motor comprising cooperating outer stator and inner rotor members; the rotor member comprising a shaft, two rotor elements each having a pair of magnetic spider members with the same number of evenly spaced teeth formed on their outer peripheries, said teeth being bent axially toward each other to form two circular rows of intermeshed teeth for each rotor element, and permanent magnets on said shaft polarized along the axis of said shaft and extending respectively between the two spider members of each rotor element whereby the teeth of said spider members are polarized at opposite magnet polarities, the magnet of one rotor element being mounted in opposition to the magnet of the other rotor element, said spider members being so positioned that the teeth extending in the same direction are in alignment and polarized at opposite magnetic polarities; the stator member comprising two pairs of magnetic members having the same number of evenly spaced teeth formed at their inner peripheries equal in number to said rotor teeth, the teeth of each pair being bent axially toward each other to form two circular rows of intermeshed teeth for each pair of magnetic members opposite and cooperating with the two circular rows of teeth of the corresponding rotor element and forming an airgap therebetween, a single phase coil for producing an alternating flux positioned between each pair of stator magnetic members, means for dephasing the fluxes produced by said coils by approximately 90°, and means for closing the magnetic circuit between said pairs of stator magnetic members, the teeth of one pair of stator members being indexed circumferentially from the teeth of the other pair of stator members by ¼ tooth pitch, the adjacent stator members being separated by a non-magnetic spacing member.

11. A split phase inductor-type synchronous motor comprising two single phase inductor type motor elements each having a cooperating outer stator and inner rotor members, a common shaft on which said rotor elements are mounted; each rotor element comprising a pair of disk-shaped magnetic spider members having the same number of evenly spaced teeth formed at their outer peripheries, said teeth being bent axially toward each other to form two rows of adjacent teeth for each rotor element, and a permanent magnet on said shaft extending between said spider members and polarized axially so as to polarize the teeth of one spider member at one magnetic polarity and the teeth of the other spider member at the opposite magnetic polarity, the magnet of one rotor element being mounted in opposition to the magnet of the other rotor element, the teeth of said spider members which are bent in the same direction being in axial alignment and of opposite magnetic polarities; each stator element comprising a single phase coil concentric with and surrounding one of the rotor elements, a magnetic circuit enclosing the outer and side walls of said coil forming a pair of axially spaced pole pieces at the inner periphery of said coil, said pole pieces having the same number of evenly spaced teeth equal in number to said rotor teeth and bent axially toward each other to form two rows of adjacent teeth for each stator element opposite and cooperating with the two circular rows of teeth of the corresponding rotor element and forming an airgap therebetween, the teeth of one stator element being displaced from the teeth of the other stator element by ¼ tooth pitch, means for providing a magnetic return path between the magnetic members of said stator elements, the portions of the magnetic circuits on the adjacent side walls of said coils being separated by a non-magnetic spacer, and means for energizing the two stator coils from an alternating current source by currents displaced in phase by approximately 90°.

12. A self-starting synchronous electric motor comprising a stator including a plurality of superposed polar sections each constituted of an annular hollow body of magnetizable material having two annular sides, an exciting coil located within said annular hollow body, the inner edge of said sides being provided with a plurality of laterally extending teeth arranged equidistantly along the internal periphery of said edge, the teeth of one edge being located in the spacings between the teeth of the other edge to constitute a plurality of opposite polar teeth in alternate succession, means to connect each of said exciting coils to one of the phases of a multiphase alternating current supply source to shift the phase of the magnetic exciting field of one of said coils with respect to the magnetic exciting fields of the adjacent coils, a rotor mounted within said stator and including an equal number of superposed polar sections each including a plurality of teeth constituting opposite poles in alternate succession with a polar spacing equal to that of the stator, and permanent magnet means mounted on each section of said rotor to polarize the teeth of each of said rotor sections oppositely in alternate succession, the polar sections of said stator being mounted with their poles in mechanical alignment while the polar teeth of one polar section of said rotor are mounted with a mechanical phase difference with respect to the teeth of the adjacent section, said mechanical phase difference being substantially equal to the electrical phase difference between the phases of said multiphase alternating current supply source.

13. A self-starting synchronous electric motor comprising a stator including two superposed polar sections each constituted of an annular hollow body of magnetizable material having two sides, an exciting coil located within said annular hollow body, the inner edge of said sides being provided with a plurality of laterally extending teeth arranged equidistantly along said edge, the teeth of one edge being located in the spacings between the teeth of the other edge to constitute a plurality of opposite polar teeth in alternate succession, means to connect said exciting coils to an alternating current supply source, a reactor connected in series with one of said coils to shift the phase of the magnetic field of said coils by substantially ninety degrees with respect to the magnetic field of the other coil, the poles of said polar sections of the stator being mounted with a mechanical phase difference between said magnetic fields, a rotor mounted within said stator and including two superposed polar sections each constituted of a permanent magnet, two disc-shaped polar pieces each cooperating with a pole of said magnet and provided with toothed perpendicular rims, the teeth of one of said disc-shaped polar pieces penetrating into the spacings between the teeth of the other disc-shaped polar piece to constituted a plurality of opposite polar teeth in alternate succession with a polar spacing equal to that of said stator, the polar teeth of said superposed polar sections of the rotor being mounted in mechanical alignment.

HUGH M. STEPHENSON.

REFERENCES CITED

The following references are of record in the file of this patent:

UNITED STATES PATENTS

| Number | Name | Date |
| --- | --- | --- |
| 1,440,729 | French | Jan. 2, 1923 |
| 2,081,993 | Gebhardt et al. | June 1, 1937 |
| 2,105,513 | Welch | Jan. 18, 1938 |
| 2,122,307 | Welch | June 28, 1938 |
| 2,212,192 | Howell | Aug. 20, 1940 |
| 2,441,079 | Orzabal | May 4, 1948 |

FOREIGN PATENTS

| Number | Country | Date |
| --- | --- | --- |
| 635,295 | France | Dec. 27, 1927 |
| 693,062 | France | Aug. 11, 1930 |